March 18, 1969     R. G. PARKISON     3,433,264

NOISE REDUCTION STRUCTURE FOR MIXING VALVE

Filed Feb. 28, 1967     Sheet _1_ of 7

INVENTOR
RICHARD G PARKISON
BY
ATTORNEY

March 18, 1969  R. G. PARKISON  3,433,264
NOISE REDUCTION STRUCTURE FOR MIXING VALVE
Filed Feb. 28, 1967
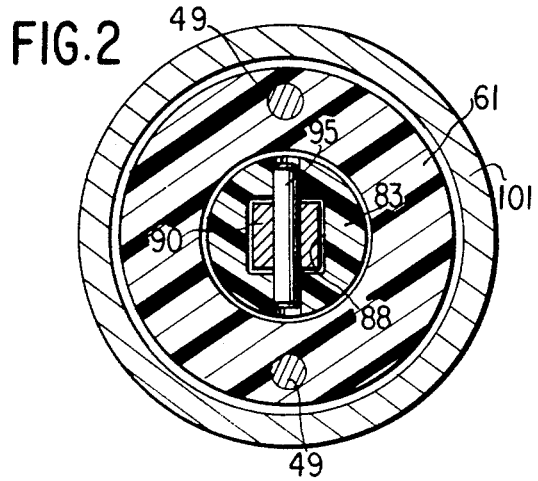
FIG. 2
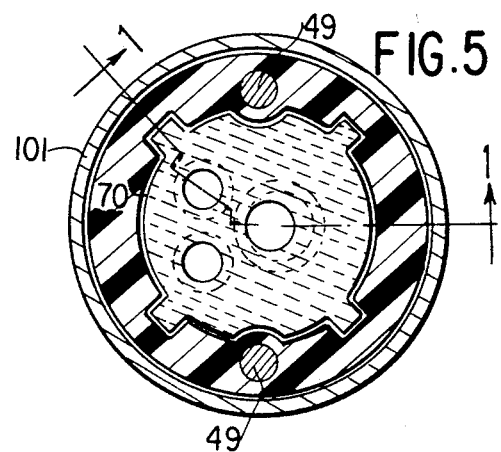
FIG. 5
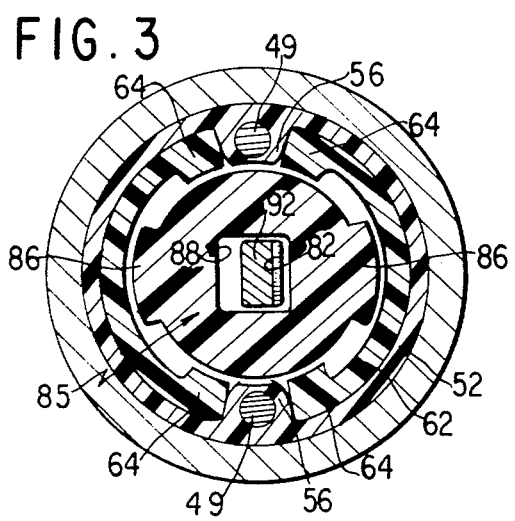
FIG. 3
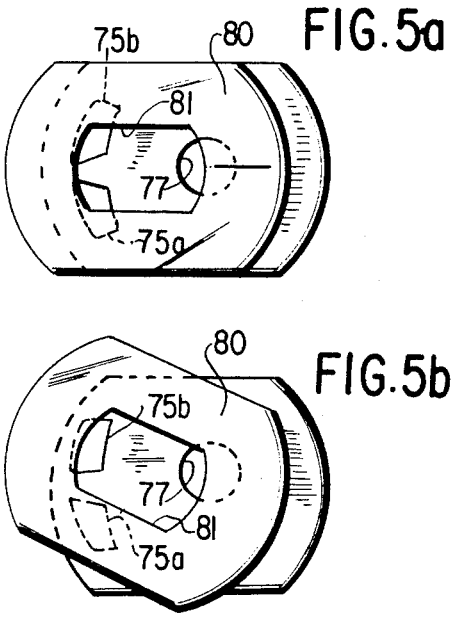
FIG. 5a
FIG. 5b
FIG. 5c
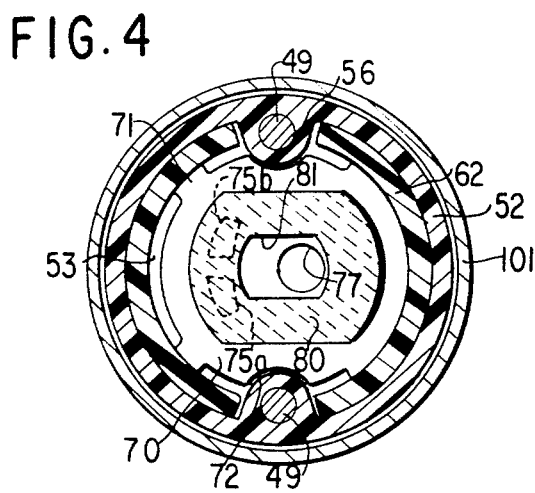
FIG. 4
INVENTOR
RICHARD G. PARKISON
BY
ATTORNEY March 18, 1969 R. G. PARKISON 3,433,264
NOISE REDUCTION STRUCTURE FOR MIXING VALVE
Filed Feb. 28, 1967

INVENTOR
RICHARD G. PARKISON
BY

ATTORNEY

INVENTOR
Richard G. Parkison
BY

ATTORNEY

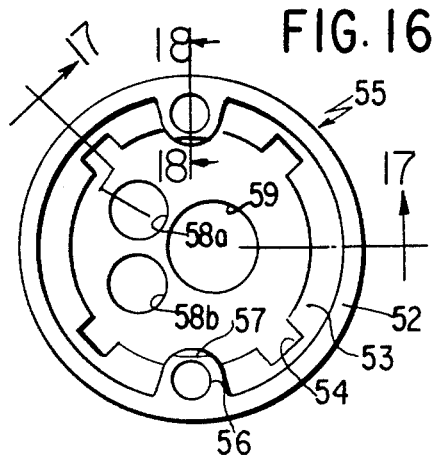
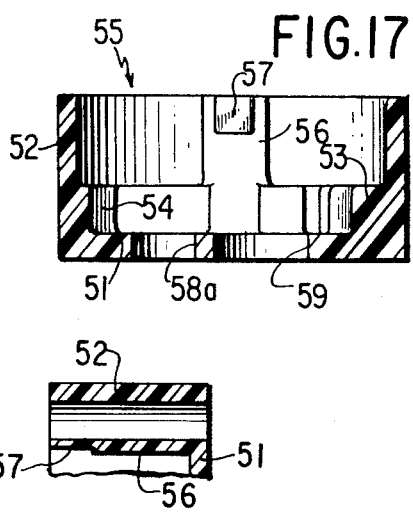
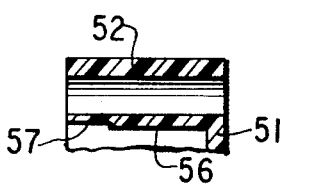
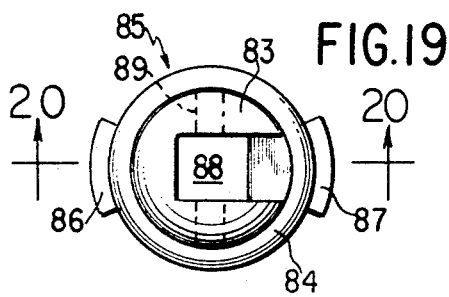
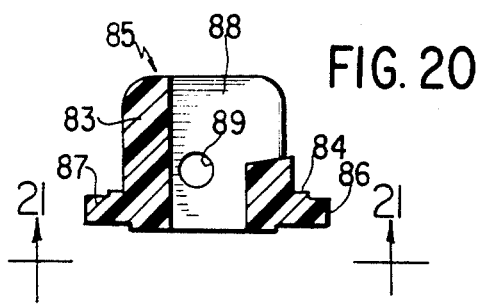
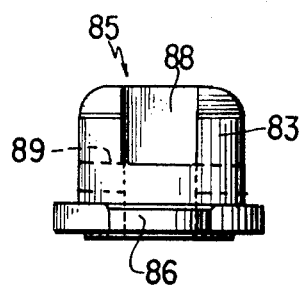
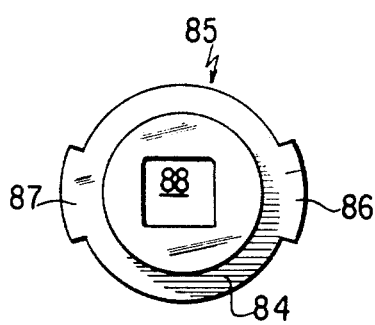

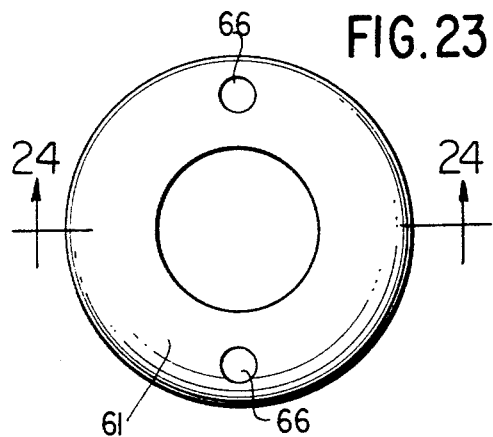
FIG.23
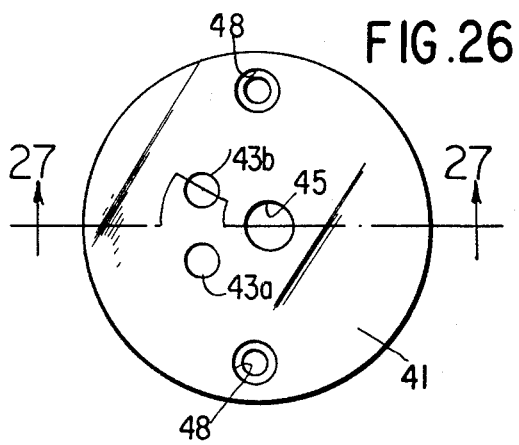
FIG.26
FIG.24
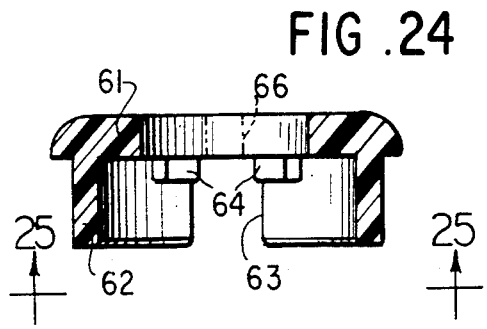
FIG.27
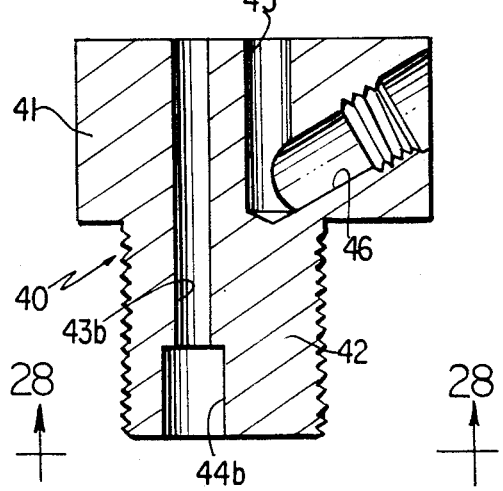
FIG.25
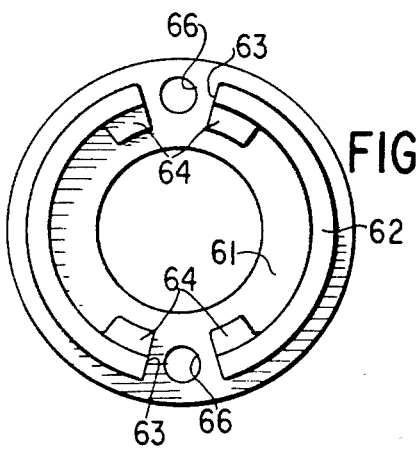
FIG.28
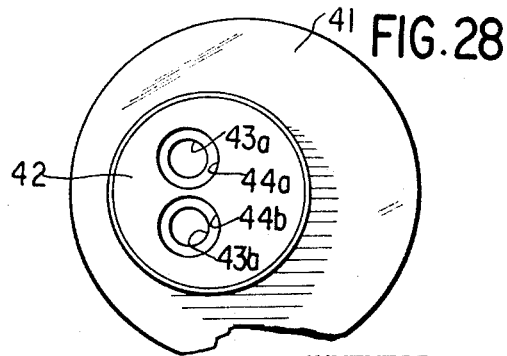
INVENTOR
RICHARD G. PARKISON
BY
ATTORNEY

United States Patent Office 3,433,264
Patented Mar. 18, 1969

3,433,264
NOISE REDUCTION STRUCTURE FOR MIXING VALVE
Richard G. Parkison, Louisville, Ky., assignor to American Standard Inc., a corporation of Delaware
Continuation-in-part of application Ser. No. 423,534, Jan. 5, 1965. This application Feb. 28, 1967, Ser. No. 619,400
U.S. Cl. 137—625.17      10 Claims
Int. Cl. F16k 19/00

ABSTRACT OF THE DISCLOSURE

A single-lever volume and proportion control valve such as used in a kitchen or bathroom which employs a ceramic member as the principal moving part. The member has a recess which provides communication between the inlet and outlet ports. The recess has a plurality of ridges in order to reduce the noise level of the valve.

Related patent application

This application is a continuation-in-part of co-pending patent application Ser. No. 423,534, filed Jan. 5, 1965, and now abandoned.

This invention relates to a single-lever volume and proportion control valves, such as used for combined hot and cold water faucets on fixtures such as kitchen and bathroom sinks. More particularly, the present invention is directed to an improved, simplified, long-lived, silent single-lever volume and proportion control valve.

Long lasting, non-leaking, single-handled faucets have been developed which employ a pair of ceramic members as the principal moving parts. The hardness of the ceramic materials provide the requisite non-wearing characteristics as well as a fluid tight seal. The contacting surfaces of the members provides a surface to surface contact such that an extremely fluid tight seal can be obtained.

It has been found in the valve structures, which employ a pair of ceramic members, one of which has a pair of inlet ports and an outlet port and the other of which has a recess which is dimensioned such that communication can be variably established between either-or-both inlets and the outlet, a susceptibility to the development of noises is present to an extent which can render the faucet commercially inacceptable.

It has now been found that the noise characteristics of the faucet can be controlled by altering the structural characteristics of the recessed portion of the ceramic member.

In accordance with the present invention, a mixing valve is provided, having a first relatively movable member, and a second member. The second member has a pair of inlet ports and an outlet port. The recess provides a flow channel for establishing communication between the inlet ports and the outlet port and has cavitation eliminating, irregular side walls. The irregular structure of the side walls apparently effects the fluid flow in a manner such that the noise level of the valve is substantially reduced.

The valve of the present invention can be broadly described as comprising a valve body formed with a pair of passages therethrough, arranged at one end for connection to hot and cold water lines, respectively, such as the quite frequently used copper tubing. These passages open through the upper surface of the valve body and a third passage opens through the upper surface of the valve body in spaced relation to the first two passages. This third passage is arranged to communicate with a spout or the like for the valve discharge. The valve body is enclosed within a valve casing, or escutcheon, which may be somewhat decorative in nature and which is in the form of an upwardly opening cylindrical cup having an aperture in its base to receive the stem of the valve body. Disposed within this casing, and secured in engagement with the upper surface of the valve body, there is a cartridge assembly which is readily and easily disengaged from the valve body and removed from the casing or escutcheon, to provide for easy inspection, maintenance and repair.

This cartridge assembly includes a generally cylindrical cup-shaped cartridge body having its base formed with ports for communication with the aforementioned passages. Positioned in the cartridge body, there is a fixed valve seat disc of a ceramic or other material, which is formed with three ports therethrough, each arranged to communciate with a respective one of the three ports in the cartridge body base communicating with the three passages in the valve body. A movable valve disc, of ceramic or other material, is positioned in sliding engagement with the upper surface of the fixed valve disc, and is arranged to be moved both longitudinally and angularly to control the communication between the ports in the fixed valve disc, the movable valve disc having an elongated flow channel recess in its under surface arranged to effect such communication.

Such movement of the movable valve disc is effected by the single control handle which extends from a pivot member which is pivotal or hinged in an angularly displaceable pivot race. This pivot member has a projection extending into a closely conforming recess in the upper surface of the movable valve disc, so that pivoting of the pivot member, by operation of the control handle, will move the movable valve disc longitudinally. The pivot race itself is angularly adjustable within a cartridge cap which is solvent welded to the cartridge body, so that turning of the pivot race will effect turning of the upper or movable valve disc to control the proportioning between hot and cold water. The longitudinal movement of the movable valve disc controls the volume of flow.

An escutcheon cap member is secured to the upper surface of the pivot member and arranged to embrace the escutcheon to enclose, with clearance, the upper end thereof, and to provide an attractive appearance to the parts. This escutcheon cap has an opening to receive the stem of the single control handle, and is movable with this control handle both in the pivotal movement of the latter and in the angular movement of the latter in adjusting the relative angular position of the movable valve disc relative to the fixed valve disc.

The means provided for maintaining a tight sealing engagement between the two ceramic valve discs, comprises a pair of axially elongated rubber rings or sleeves, each having one end disposed in a recess surrounding a port in the fixed valve disc and each having the other end engaged with the upper surface of the valve body. These rings have an axial length such as to exert a bias between the upper surface of the valve body and the lower surface of the fixed valve disc, and thus maintain the latter in tight sealing engagement with the movable valve disc which is retained against upward movement by virtue of the connection between the cartridge cap and the cartridge body, with the cartridge cap bearing on an annular flange of the pivot race. The arrangement is such that the pressure of the fluid also exerts a force to hold the two valve discs together.

Machine screw means are arranged to maintain the cartridge in operative connection with the valve body, and these screw means are arranged for easy access to provide for ready removal of the cartridge from the valve assembly, as for inspection, maintenance or repair.

The invention will be more fully understood and the objects of the invention will become apparent from the following description, wherein a typical embodiment of the invention is described in conjunction with the drawing, wherein like reference numbers indicate like parts, and wherein:

FIGS. 2, 3, 4 and 5 are horizontal, sectional views taken on the correspondingly numbered lines of FIG. 1;

FIGS. 5a, 5b and 5c are schematic plan views illustrating various positions of the movable valve member with respect to the ports of the fixed valve member;

FIG. 16 is a top plan view of the cartridge body;

FIG. 17 and FIG. 18 are sectional views of the cartridge body, taken on the correspondingly numbered lines of FIG. 16;

FIG. 19 is a top plan view of the pivot race;

FIG. 20 is a sectional view of the pivot race taken on the line 20—20 of FIG. 19;

FIG. 21 is a bottom plan view of the pivot race, looking along the line 21—21 of FIG. 20;

FIG. 22 is a side elevational view of the pivot race, looking from the right of FIG. 20;

FIG. 23 is a top plan view of the cartridge cap;

FIG. 24 is a sectional view of the cartridge cap, taken on the line 24—24 of FIG. 23;

FIG. 25 is a bottom plan view of the cartridge cap, looking along the line 25—25 of FIG. 24;

FIG. 26 is a top plan view of the faucet or valve body;

FIG. 27 is a sectional view of the faucet or valve body taken on the line 27—27 of FIG. 26;

FIG. 28 is a partial bottom view looking along the line 28—28 of FIG. 27; and

Figure 1:
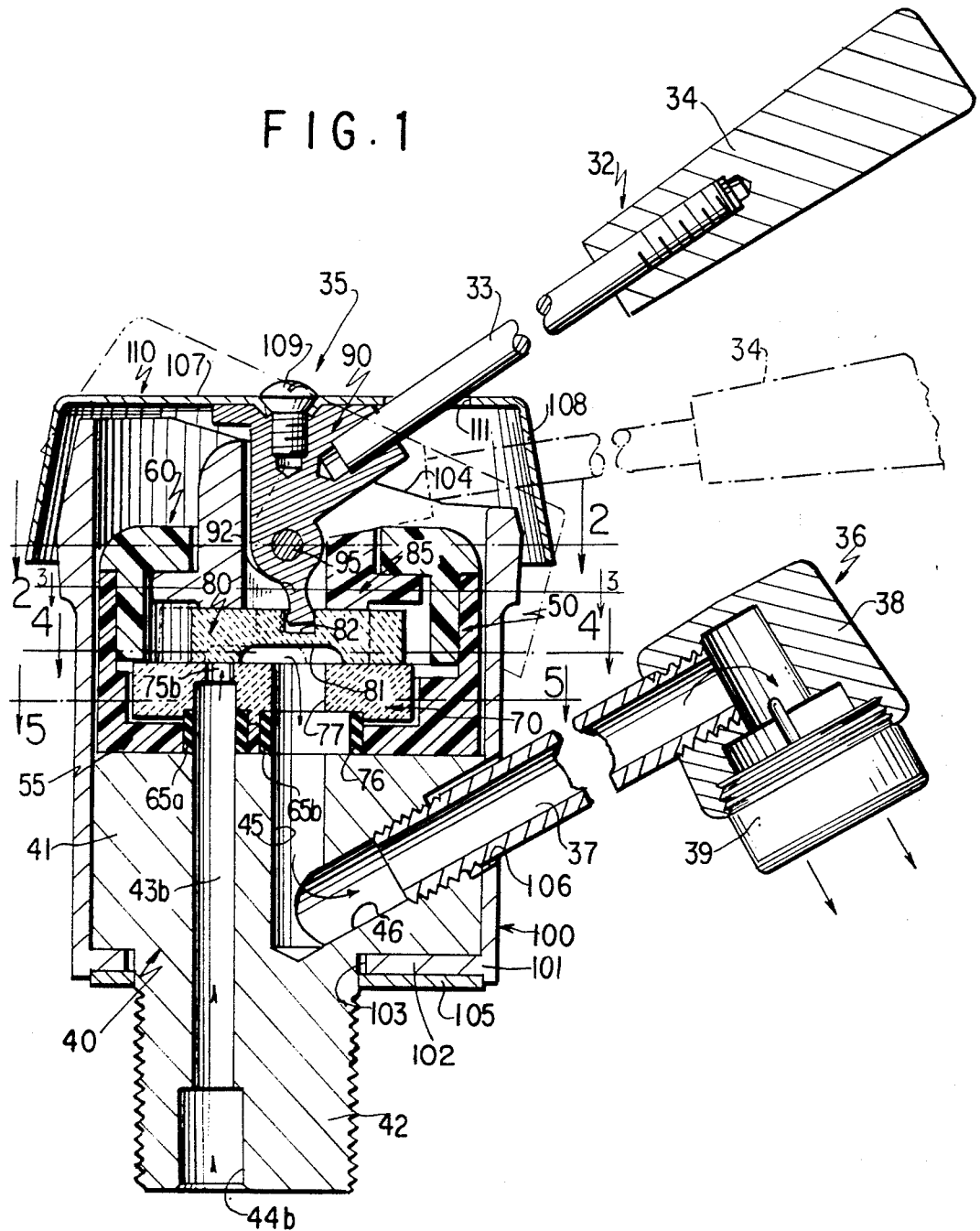
FIG. 1 is a vertical sectional view through a valve assembly embodying the invention and taken on the line 1—1 of FIG. 5.
Figure 6:
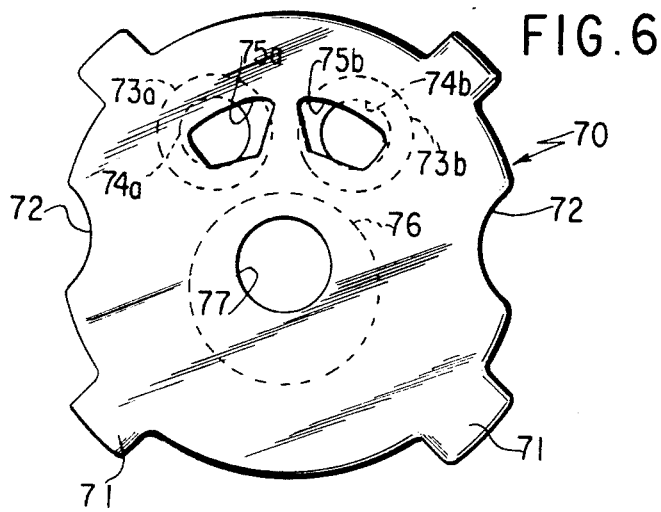
FIG. 6 is a top plan view of the fixed valve disc.
Figure 9:
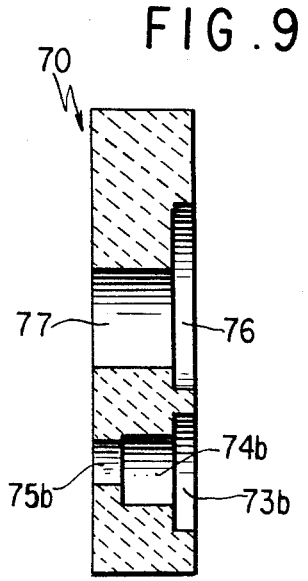
FIG. 9 is a sectional view taken on the line 9—9 of FIG. 8.
Figure 7:
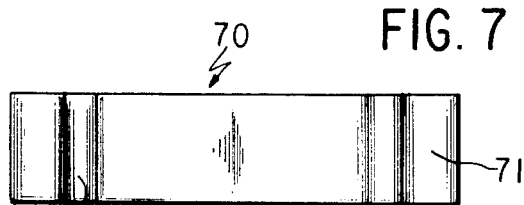
FIG. 7 is a side elevational view of the fixed valve member.
Figure 8:
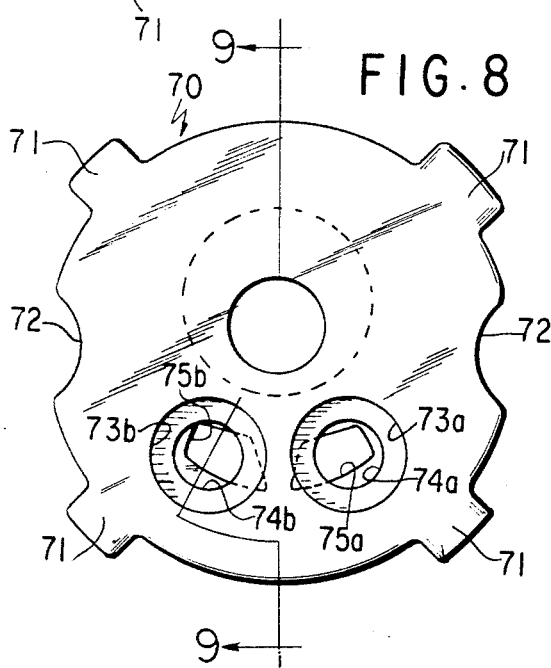
FIG. 8 is a bottom plan view of the fixed valve member.
Figure 10:
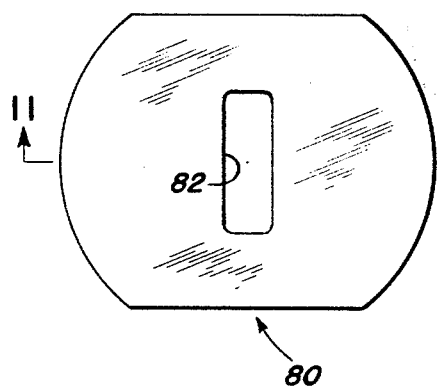
FIG. 10 is a top plan view of the movable valve member.

Referring particularly to FIG. 1, which is a sectional view illustrating the overall assembly of the invention valve, the valve is generally indicated at 35 as including a valve body 40, a single control handle assembly 32 and a spout assembly 36. A generally cylindrical escutcheon 100 laterally embraces valve body 40 and extends upwardly therebeyond to form a compartment receiving a cartridge, or valve assembly, 50. Cartridge 50 includes a generally cylindrical cup-shaped cartridge body 55 whose upper end is substantially closed by a cartridge cap 60 which may be solvent welded to cartridge body 55.

Cap 60 and body 55 of cartridge 50 form an enclosure and retaining means for the operating parts of the valve assembly. These operating parts include a fixed valve disc 70, a movable valve disc 80 cooperable with the fixed valve disc 70, a pivot race 85, angularly adjustable in cartridge 50, a pivot 90 pivotally mounted in race 85 and having handle assembly 32 secured thereto, and an escutcheon cap or plate secured to pivot 90 for movement therewith.

The arrangement of the parts is such that linear movement, backwards and forwards, of handle assembly 32 controls the volume of flow from spout assembly 36, whereas angular movement of handle assembly 32 controls the proportioning of the cold and hot water, all in a manner to be more fully described hereinafter. As will also be pointed out hereinafter, handle assembly 32 can be moved to any proportioning position without turning on the water flow, and the water flow may be thereafter initiated. However, it is not necessary that the parts operate in this manner as the water flow can be turned on in any position of the control handle 32.

Referring more particularly to FIGS. 1 through 5, 26, 27 and 28, valve body 40 is a machined casting of brass or any other suitable corrosion-resistant material, and includes a generally cylindrical main body portion 41 and a laterally offset cylindrical and threaded extension 42. A pair of somewhat laterally spaced bores or passages 43a and 43b extend from the outer or lower end face of extension 42 through the upper or outer face of main body portion 41. The lower end of each bore 43a and 43b is enlarged, as at 44, to have secured therein hot and cold water lines, not shown. These inlet connections may be, for example, copper tubing. A third bore 45 extends downwardly from the upper surface of main body portion 41 to about the inner end of extension 42 and communicates with a radially and upwardly extending bore 46 which is threaded to receive one threaded end of a tube 37 forming part of spout assembly 36. The other threaded end of tube 37 is threaded into a spout head 38 which may have an aerator 39 secured therein in a known manner and having a known form of construction forming no part of the present invention.

By reference to FIG. 26, it will be noted that inlet bores 43a and 43b are disposed to one side of the center or axis of main valve body portion 41 and are equally spaced from a diameter extending through outlet bore 45. The latter is centered on this particular diameter, but is offset somewhat to the other side of the valve body axis relative to the bores 43a and 43b. Also outlet bore 45 is somewhat larger in diameter than inlet bores 43a and 43b. Adjacent the ends of another diameter substantially perpendicular to the first mentioned diameter, body portion 41 is formed with a pair of bores 48 and these bores are threaded to receive machine screws 49 for securing cartridge 50 to valve body 40.

Referring particularly to FIGS. 1 through 5, 16, 17 and 18, the body 55 of cartridge 50 is generally cylindrical cup-shaped member molded of a suitable plastic composition material having desired characteristics of relative dimensional stability. Cartridge body 55 has a generally flat circular bottom wall 51 and a cylindrical lateral wall 52. Around the inside corner formed at the junction of these two walls, there is a ledge 53 formed with radially extending, substantially rectangular and nearly equiangularly spaced notches 54, preferably four in number as best seen in FIG. 16. The purpose of these notches will be made clear hereinafter.

A pair of axially elongated ears 56 are formed on the inner surfaces of lateral wall 52, each being disposed substantially equi-distant between a pair of adjacent notches 54. Each ear 56 has a longitudinal bore therethrough to receive a machine screw 49. The radially inner surfaces of ears 56 are preferably generally cylindrical and the upper portion of each cylindrical surface has a flattened or concave upper region, such as indicated at 57. Bottom wall 51 of cartridge body 55 is formed with a pair of circular ports or apertures 58a and 58b respectively aligned with passages 43a and 43b when body 55 is positioned against the upper surface of valve body 40. Ports 58a and 58b are of somewhat larger diameter than are ports 43a and 43b. Bottom wall 51 is further formed with a relatively large diameter aperture 59 arranged to communicate with outlet port or bore 45 in valve body 40 when cartridge body 55 is positioned on the upper surface of the valve body. Port 59 has a substantially larger diameter than port 45 and is eccentric with respect to the latter, as best seen in FIG. 5.

The open upper end of cartridge body 55 is closed by cartridge cap 60 which is best seen in FIGS. 1 through 5, 23, 24, and 25. Cap 60 is molded of the same material as is body 55. The cap includes a substantially flat annular outer wall 61, having a rounded outer edge as best seen in FIG. 24. A cylindrical flange 62 extends axially inwardly from the inner surface of wall 61, being spaced inwardly of the outer periphery of wall 61 by a distance equal to the thickness of lateral wall 52 of cartridge body 55. At diametrically opposite points, flange 62 is formed with notches 63 which have an angular extent substantially equal to the angular extent of ears 56 of cartridge body 55 so that, when cap 60 is assembled with body 55, these notches 63 receive the ears 56 in closely confining relation. Adjacent each edge of each notch 63 there is an ear 64 extending from the inner surface junction of wall 61 and flange 62, the ears 64 being equal in angular extent. The purpose of these ears will become apparent as the description proceeds. Wall 61 of cap 60 is further provided with a pair of diametrically aligned apertures 66 which are alignable with the bores in ears 56 of cartridge body 55 to receive the machine screws 49. Apertures 66 may be enlarged, if desired, to form recesses receiving the heads of machine screws 49.

As previously stated, cartridge 50 includes all of the operating elements of the valve assembly so that the cartridge may be readily removed and replaced with a new one. These elements are held in position and are retained in closed relation by cap 60 having a tight fit in body 55 and, for this purpose, the outer diameter of flange 62 is made equal to the inner diameter of lateral wall 52 of body 55, so that a solvent-welded joint may be obtained between these two parts. Furthermore, the cartridge 50 is secured to the valve body 40 by virtue of the machine screws 49 which extend through apertures 66 in cap 60 and through the apertures in ears 56 of body 55, and are threaded into the threaded holes or bores 48 in body 40.

The important parts for controlling the proportioning and rate of flow of fluid are a pair of ceramic valve members 70 and 80, which are of general disc-form. The disc 70 will hereinafter be referred to as the "fixed disc" or "seat," whereas the disc 80 will hereinafter be referred to as the "movable disc." Both of these discs or seats are substantially flat-surfaced elements of preferably ceramic material which have flat highly polished engaging surfaces to afford a tight seal therebetween when the discs are maintained in pressure engagement.

The fixed disc 70 is best seen in FIGS. 1 through 5 and 6 through 9. Referring to these figures, disc 70 is a substantially flat circular disc whose outer periphery has radially projecting substantially rectangular ears 71 arranged to seat in the notches 54 in ledge 53 of cartridge body 55. It should be noted, at this point, that the notches 54 and the ears 71 are not exactly equally angularly spaced, although each ear is alignable with a respective notch. The purpose of the non-equal angular spacing is to provide that fixed disc 70 can be positioned into cartridge body 55 in only one particular orientation.

At locations corresponding to the axial ears 56 on the inner surface of lateral wall 52 of cartridge body 55, disc 70 is formed with shallow arcuate recesses 72 arranged to have a conforming fit with the ears 56. The undersurface of disc 70 is formed with a pair of circular recesses 73a and 73b which are equal in diameter to the inlet apertures 58a and 58b of cartridge body 55, and are so positioned as to be axially aligned with these inlet apertures when disc 70 is placed against the inner surface of bottom wall 51 of cartridge body 55. Smaller diameter bores 74a and 74b extend upwardly from recesses 73a and 73b, respectively, these smaller diameter bores being equal in diameter to the inlet bores 43a and 43b of valve body 40 and being coaxial therewith.

The smaller diameter bores 74a and 74b terminate short of the upper surface of valve disc 70 where they communicate with inlet and proportioning recesses 75a and 75b in the upper surface of disc 70. These inlet recesses extend from within the peripheries of bores 74a and 74b in a generally arcuate direction toward each other, the recesses being enlarged toward their adjacent ends and terminating in substantially rectilinear end walls, the radially inner sidewalls being substantially rectilinear, whereas the radially outer sidewalls are slightly arcuate. The loading edges of adjacent ends of the recesses are made angular as shown to eliminate sudden shut-off which might cause water hammer.

The undersurface of disc 70 is further formed with a relatively large diameter circular recess 76 which is equal in diameter to the outlet aperture 59 in bottom wall 51 of cartridge body 55, and concentric therewith. An outlet port 77 extends from outlet recess 76 through the upper surface of disc 70, and this outlet port is equal in diameter to the outlet bore 45 in valve body 40 and is coaxial therewith.

The movable disc 80 is best seen in FIGS. 1 through 5, and 10, 11 and 12. Referring to these figures, movable member 80 is a substantially flat disc which is substantially oval in plan with flat or rectilinear longitudinal edges. The flat undersurface of movable disc 80 is formed with an elongated, and generally oval, recess 81. Recess 81, while generally oval, has flattened or rectilinear longitudinal edges. This recess is arranged to establish communication between one or both of the inlet recesses 75a, 75b of fixed disc 70 and the outlet port 77 of the latter, or to completely interrupt communication between the inlet recesses and the outlet port. The upper surface of movable disc 80 is formed with a rectangular recess 82 which extends at substantially right angles to the longer axis of recess 81 is disposed substantially centrally of disc 80. The purpose of recess 82 will become apparent as the description proceeds.

The peripheral edge 81a of the recess 81 is a hard, sharp edge and prevents fouling of the valve by wiping clean the surface of the cooperating valve member 70. The irregularities on the walls of the recess are in the form of ridges or steps 81b.

The ridges apparently eliminate noise by overcoming a problem which can be termed "cavitation." Cavitation occurs when the velocity of the liquid at some local point reaches a value that is sufficiently high to cause the pressure to approach absolute zero. The decrease in pressure causes gas bubbles to grow until they reach a higher pressure zone downstream, at which point they instantaneously collapse. The sudden collapse or implosion of the gas bubbles results in the undesirable noise in the valves. The sharp leading edge 81a of the valve member 80 projects into the fluid stream causes extremely high local velocities along with the resultant cavitation and noise, because of the previously noted function of the sharp edges, it is not feasible to eliminate the noise problem by eliminating the sharp edge.

The ridges 81b apparently break up, divide, and distribute the bubbles which form at the opening edge 81a of the recess 81, over a larger area at each succeeding ridge. This brings about a reduction of the velocity and an increase of the pressure, thereby preventing the bubbles from growing large enough to cause excessive noise.

The nose of a single step or ridge may not be adequate, and a plurality of steps will normally have to be used in order to get the desired results.

The degree of cavitation which is taking place can be experimentally viewed through the use of a stroboscope when the member 80 is made of a transparent material. When the recess in valve member 80 is made with a cross-section that is essentially square, numerous gas bubbles form and grow to a relatively large size before implosion occurs—this at velocities which represent common ranges of usage. The placing of a screen covering the inner walls of the recess, while not eliminating the formation of small bubbles, does prevent their growth; and the noise level is therefore relatively low. The screen apparently prevents the growth of the bubbles by progressively dividing the cavitation bubbles as the stream carrying them passes through the successive strands of wire. Finally the bubbles reach an area downstream where the velocity is reduced and the pressure is sufficient to cause collapse of these finely divided, small bubbles with a resulting low-intensity noise level that is well within acceptable commercial limits.

Although the use of the screen was completely satisfactory in preventing the formation of large bubbles, the screens posed a problem of attachment to the ceramic in the manufacture of the product and were also thought to be susceptible to fouling with foreign material in the water system. Therefore, another means was sought to provide the low noise level performance of the screens but without the attachment and fouling problems.

Figure 11:
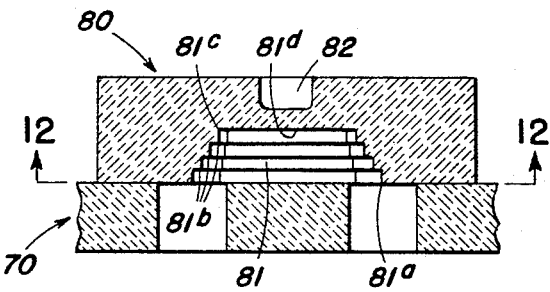
FIG. 11 is a vertical sectional view taken on the line 11—11 of FIG. 10.
Figure 12:
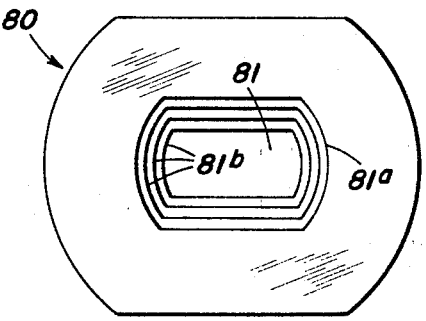
FIG. 12 is a bottom plan view of the movable valve member as viewed from the line 12—12 of FIG. 11.
Figure 13:
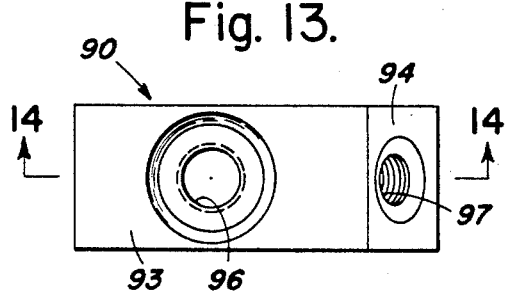
FIG. 13 is a top plan view of the pivot.
Figure 15:
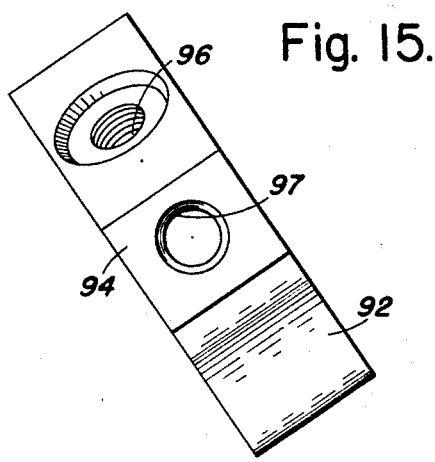
FIG. 15 is a view of the pivot looking along the line 15—15 of FIG. 14.
Figure 14:
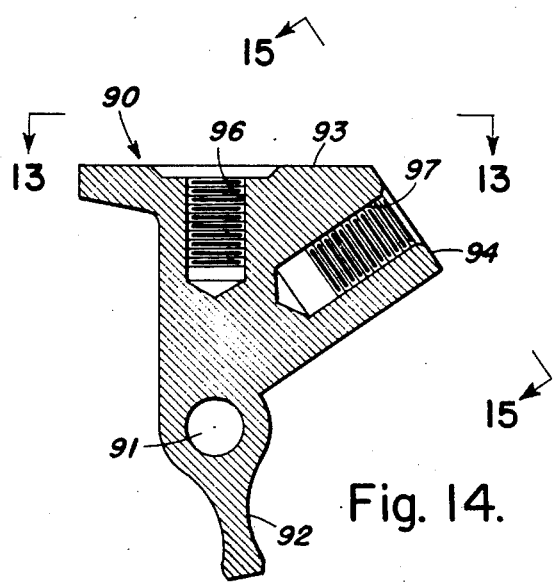
FIG. 14 is a sectional view of the pivot, taken on the line 14—14 of FIG. 13.
Figure 29:
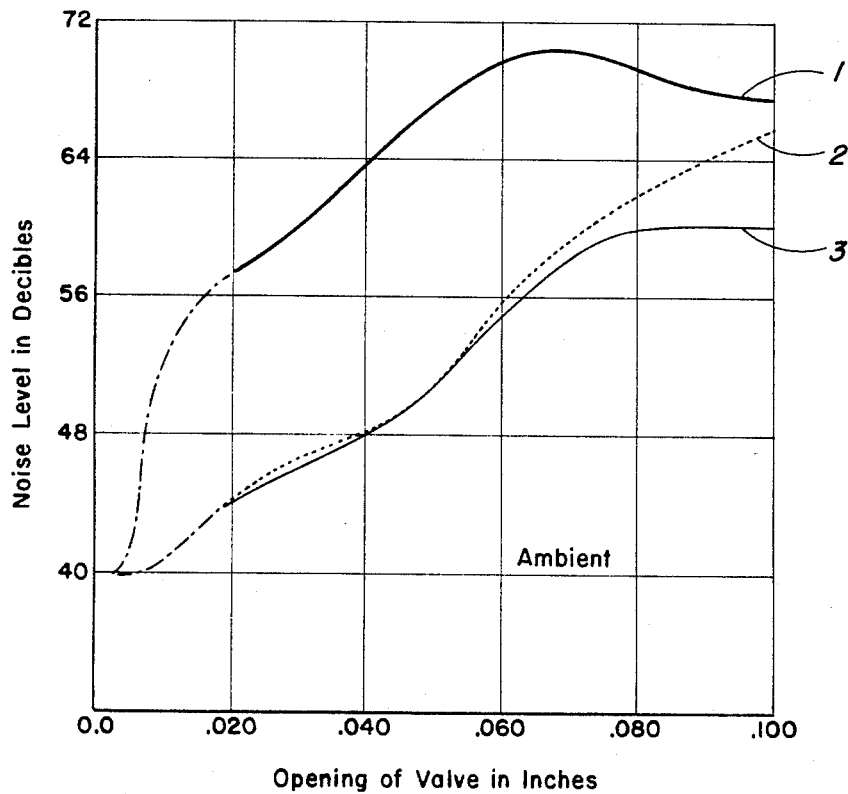
FIG. 29 is a graph which compares noise levels of valves employing different ceramic seat configurations.

The concentric steps described previously in valve member 80 provided a satisfactory solution. The graph shown in FIGURE 29 compares the noise level of (1) the recess without steps,
(2) the recess without steps but with a screen secured against the walls of the recess, and
(3) the stepped recess, as shown in FIGURES 11 and 12, the graph depicts the opening of the valve in inches on the abscissa plotted against the noise level in decibels on the ordinate. Various other recess configurations were fabricated and tested with results ranging between the curves shown.

The tests, the results of which are plotted in FIGURE 29, were conducted with a water pressure of about 90 pounds per square inch (p.s.i.) and an ambient noise level of about 40 decibels.

Movement of disc 80 in the direction parallel to the longer axis of recess 81 is effected by means of a pivot 90 which is pivotally mounted in a pivot race 85. Pivot race 85 is angularly adjustable in cartridge 50, and angular adjustment of pivot race 85, in a manner to be described, angularly adjusts disc 80 to effect proportioning of the water flow through the valve assembly.

Pivot race 85 is best seen in FIGS. 1 through 5 and 19 to 22. Referring to these figures, pivot race 85 is formed of a suitable plastic composition material and includes a generally cylindrical main body portion 83 having a peripheral flange 84 at its lower end, with arcuate ears 86, of lesser height than flange 84, extending from this flange and forming therewith shoulders 87. A substantially rectangular slot 88 is formed in main body portion 83 and extends downwardly from the upper surface thereof, radially inwardly from the lateral surface thereof, and through the lower surface thereof, as best seen in FIG. 20. Recess 88 has parallel side walls and a circular bore 89 is formed diametrically through body portion 83 somewhat above the level of flange 84. Bore 89 receives a stainless steel pivot pin 95 for a pivot 90.

Pivot 90 is best seen in FIGS. 1 to 5, 13, 14 and 15. This pivot may be a machined brass casting and has the general characteristics of a bell-crank lever. The pivot has a bore 91 extending transversely thereof to receive the stainless steel pivot pin 95. An operating finger or arm 92 extends in one direction radially from bore 91, and its outer end has a rectangular cross-section of a nature such as to have a close conforming fit in the recess 82 in the upper surface of movable disc 80. An enlarged body portion extends in another radical direction from bore 91 and has a pair of outer surfaces, 92 and 94, which are disposed at substantially 45° to each other and which are substantially flat.

Surface 93 has a threaded bore 96 extending inwardly therefrom, and surface 94 has a threaded bore 97 extending inwardly therefrom. The purpose of bore 96 will be referred to hereinafter. Bore 97 receives one threaded end of a rod 33 forming part of the handle assembly, the other threaded end of rod 33 having screwed thereon an operating handle 34.

The assembly of the parts so far described will be best seen with reference to FIGS. 1 through 5. Fixed disc 70 is positioned within cartridge body 55 with its ears 71 engaged in the notches 54 in ledge 53, and its arcuate recesses 72 in engagement with axial ears 56. This properly aligns the inlet ports and recesses in disc 70 with the inlet and outlet ports in body 40, when cartridge 50 is placed into the valve assembly. Such alignment of cartridge 50 with body 40 is effected when machine screws 49 are inserted through the cartridge body and screwed into the bores 48 in body 40.

Pivot 90 is assembled with pivot race 85 by positioning the pivot in the recess 88 of pivot race 85, between the parallel spaced inner walls thereof which have a spacing substantially equal to the thickness of pivot 90, and driving in the stainless steel pivot pin 95. With such assembly, operating finger 92 of pivot 90 projects below the lower surface of pivot race 85. It will be noted that the bearing portion of this lower surface is somewhat reduced in diameter as compared with the diameter of flange 94.

Movable disc 80 is placed in surface to surface engagement with fixed disc 70, after which pivot race 85 is positioned on top of movable disc 80 with operating finger 92 of pivot 90 engaged in recess 82 in the upper surface of movable disc 80. Cartridge cap 60 is aligned with pivot race 85 in such a manner that ears 86 on the pivot race are disposed between ears 64 of cap 60, as best seen in FIG. 3. The shoulder portions 87 define the outer limits of flange 84 so that the latter provides a reduced area of frictional contact between pivot race 85 and the inner surface of outer wall 61 of cartridge cap 60. Cartridge cap 60 is then angularly adjusted until the apertures 66 therethrough are aligned with the bores of ears 56 of cartridge body 55, and the latter are, in turn, aligned with threaded bores 48 in body 40. Machine screws 49 are then inserted and their ends are threaded into bores 48, with flange 62 of cap 60 being solvent-welded within the lateral wall 52 of cartridge body 55.

When the cartridge is so assembled, there is some axial play of the parts, particularly between the discs 70 and 80. It is desirable that there be a tight sealing fit between fixed disc 70 and movable disc 80, to prevent leakage. For this purpose there are provided a pair of rings or sleeves 65a, these rings being of rubber or equivalent material. Each ring 65a has an outer diameter substantially equal to the diameter of inlet ports 58a and 58b in bottom wall 51 of cartridge body 55, and an inner diameter substantially equal to the diameter of recesses 73a and 73b in the first disc 70. The axial length of rings 65a is slightly in excess of the sum of the thickness of bottom wall 51 of cartridge body 55 and the depth of recesses 73a and 73b.

Ring 65b has an outer diameter substantially equal to the diameter of outlet port 59 in bottom wall 51 of cartridge body 55, and a wall thickness of the same order as that of rings 65a. The axial length of ring 65b is equal to that of ring 65a. As screws 49 are tightened, the rings 65a and 65b are somewhat compressed axially to bias fixed disc 70 into tight sealing engagement with movable disc 80.

It will be observed that the cross sectional area of the recesses 73a and 73b in the fixed disc 70 is greater than the cross sectional area of bores 74a and 74b respectively and also greater than the inlet recesses 75a and 75b respectively. Because of this larger area of the recesses 73a and 73b, the inlet pressure acting thereon provides an additional force tending to hold the discs 70 and 80 together with the valve in the closed position. This force results from the greater area on the downstream side of the fixed valve disc 70 being exposed to the inlet fluid pressure. Although the rings 65a are accommodated in the recesses 73a and 73b, such rings are made of rubber or other resilient material, as previously mentioned, such that these rings tend to act as a fluid, that is, the fluid pressure acting on the inside diameter thereof is translated to a longitudinal or axial force tending to increase the axial length of the rings 65a to thereby urge the two discs 70, 80 together.

It will be observed that a like relationship exists with the valve in the open position. The cross-sectional area of the outlet recess 76 which accommodates ring 65b is greater than the area of the recess 81 in movable seat 80 so that here again a resultant force is set up tending to urge the discs 70 and 80 together.

The assembly is completed by an escutcheon 100 which is shown in FIG. 1. Escutchen 100 includes a cylindrical wall 101 which laterally embraces body 40 and cartridge 50 and extends a distance above the upper end of cartridge 50. Adjacent its lower end, wall 101 has a radially inwardly extending annular flange 102 which has an opening 103 aligned with the extension 42 of the valve body 40 and having some clearance therewith. This flange 102 is set inwardly somewhat from the lower end of cylindrical wall 101 to form a seat for a gasket 105 which has its opening laterally offset to have a close confirming fit with extension 41 while the gasket, in turn, has a close conforming fit in the recess formed by wall 101 and bottom flange 102. This gasket may be formed of any suitable material and is arranged to provide a tight sealing fit between the valve assembly and the basin.

The upper end of cylindrical wall 101 is so formed that it has parallel horizontal front and rear surfaces but with the upper surface being disposed at a substantially higher level than the lower surface, as best seen in FIG. 1. The upper end lower surfaces are interconnected by sloping surfaces 104 which slope downwardly toward the front and operating face of the fixture. Cylindrical wall 101, at a zone somewhat above flange 102, is formed with an opening 106 for spout tube 37.

Associated with the escutcheon 100 there is an escutcheon plate or cap 110 which has a substantially flat and circular top wall 107 from which depends a downwardly and outwardly flaring skirt 108, the lower edge of skirt 108 extending somewhat below the upper end of escutcheon 100 at both the front and rear faces thereof. Wall 107 is secured flush to the surface 93 of pivot 90 by means of a screw 109 threaded into the threaded bore 96. Top wall 107 of escutcheon plate 110 has an eccentric opening 111 to receive the rod 33 of handle assembly 32.

As stated, volume control is effected by pivoting handle 32 about pivot pin 95. This effects movement of movable disc 80 in a direction parallel to the longer axis of recess 81 in its under surface. It should be noted that, in every position of movable member 80, recess 81 is in communication with outlet port 77 is fixed disc 70. However, in the position of FIG. 1 it will be noted that recess 81 is not in communictaion with the recesses 75a and 75b in the upper surface of fixed disc 70, so that there is no flow between inlet bores 43a and 43b and outlet bore 45 in valve body 40.

If handle 32 is swung downwardly from the position shown in full lines in FIG. 1 to the position shown in dotted lines therein, recess 81 in the under surface of movable member 80 will be moved so that it is in communication with one or both recesses 75a or 75b in the upper surface of fixed disc 70 so that communication is established between one or both of the inlet bores 43a, 43b and outlet bore 45 in valve body 40. The particular area of each recess 75a, 75b in communication with recess 81 is determined by the relative angular position of movable disc 80. For a better understanding of how proportioning is effected, reference is made to FIGS. 5a, 5b and 5c.

If it is assumed that these figures represent top plan views of movable disc 80, and if it is further assumed that, looking at the fixture from the operating end thereof, the hot water connection is at the left and the cold water connection is at the right, then the following will be clear from reference to FIGS. 5a, 5b and 5c. FIG. 5a illustrates the faucet fully opened and delivering equal amounts of hot and cold water. It will be noted that, in this case, the disc 80 has not been angularly displaced but has been displaced only linearly so as to establish communication between recess 81 and recesses 75a and 75b, with recess 81 remaining in communication with outlet port 77.

FIG. 5b shows the position of the parts with "full on" from the cold water and no hot water. In such case, the proportioning has been effected by swinging disc 80 clockwise by swinging handle 32 clockwise, and thus turning pivot race 85 clockwise to its full limit in which one of the ears 86 engages an ear 64. In such case, recess 81 is in communication with recess 75b and also with port 77, but is not in communication with recess 75a.

In FIG. 5c, there is illustrated a position in which the proportion is approximately three quarters cold water and one quarter hot water. In this case, the movable disc 80 has been angularly displaced clockwise a small amount but not the full amount. This figure further illustrates an approximately "half open" position in which disc 80 has been moved linearly only half its total range of movement.

It will be noted that the handle 32 may, if desired, be swung either to the full clockwise position or the full counterclockwise position without being pivoted about pin 95 from the fully closed position to select the proper proportion of hot and cold water before initiating flow of either. After being so swung, handle 32 is swung downwardly about pivot 95 to displace movable disc 80 linearly while maintaining its angular orientation, and this initiates the water flow to a desired volume in accordance with the position of handle 32.

Among the features of the present invention are the fixed valve disc 70 and the movable valve disc 80, both of which are formed of ceramic material and have highly polished and very flat engaging surfaces to obtain a tight seal therebetween. A further feature is the use of the rubber rings 65a and 65b to continuously bias these two discs into tight sealing engagement, and the arrangement whereby the fluid pressure tends to urge the discs together. It should be noted that this biasing is effected on the fixed disc so that there is no torque exerted on the rubber sleeve or ring 65a or 65b. A further feature of novelty is the provision of the pivot race 85 which mounts the pivot 90, with the pivot 90 effecting longitudinal displacement of movable disc 80 and the pivot race 85 providing for angular displacement of movable disc 80. It is this feature which provides that the valve parts may be moved to the desired proportioning position in advance of initiating any flow of water through the outlet spout.

Another feature of the invention is the provision of the cartridge 50 which includes all of the operative parts of the valve and which may be easily disassembled from valve body 40 by simply removing the bolts 49 and a second similar cartridge assembly easily mounted onto the valve body so that the interruption of service is reduced to a minimum. Since the cartridge contains all the working parts of the faucet, a replacement of this cartridge will make the faucet work like new.

While a specific embodiment of the invention has been shown and described in detail to illustrate the application of the principles of the invention, it will be understood that the invention may be embodied otherwise without departing from such principles.

What is claimed is:

1. In a mixing valve for use in combined stream fluid fixtures, the combination comprising; a fixed valve seat means having a pair of inlet ports and an outlet port; a movable valve member in slideable contact with said fixed valve seat means and having a flow channel recess extending along the surface which is in contact with said fixed valve seat means, said recess having a length greater than the minimum distance between said inlet ports and said outlet port and a width greater than the minimum distance between said inlet ports; cavitation eliminating means in said recess; and means operable to move said movable valve member.

2. The mixing valve of claim 1, wherein said inlet ports are spaced longitudinally from said outlet port equally distant to either side of a longitudinal line intersecting said outlet port, and means operable to move said valve member means, longitudinally of said line and to displace said valve member angularly in a plane parallel to said valve seat means.

3. The mixing valve of claim 1, wherein said fixed valve means and said movable valve member are substantially flat discs, superimposed in surface to surface engagement with each other, said surfaces being flat and highly polished and inter-engaging in a manner so as to provide a tight waterproof seal therebetween.

4. The mixing valve of claim 1, wheerin said cavitation eliminating means comprises; a series of ridges formed in the side walls of said recess.

5. The mixing valve of claim 1, wherein said recess is in continuous communication with said outlet port and interconnects said outlet port and at least one inlet port only upon longitudinal movement of valve member toward said inlet ports; said recess, upon angular displacement of said valve member in advance of simultaneously with, or subsequent to the longitudinal movement thereof, being aligned either to overlap only the inlet port or to partially overlap both inlet ports in a selectively variable ratio.

6. The mixing valve of claim 5, wherein said recess has side walls which are in the form of a series of ridges, whereby the distance between opposite side wall becomes smaller in a stepwise progression, away from said fixed valve seat means.

7. The mixing valve of claim 6, wherein the surface of said movable valve member which is in contact with said fixed valve means, and the portion of the inside surface of said recess which is adjacent said surface is approximately perpendicular to said surface, whereby a sharp leading edge is provided for cleaning the surface of said fixed valve means.

8. The mixing valve of claim 3, wherein said cavitation eliminating means comprise: a series of ridges formed in the side walls of said recess.

9. The mixing valve of claim 4, wherein the surface of said movable valve member which is in contact with said fixed valve means, and the portion of the inside surface of said recess which is adjacent said surface is approximately perpendicular to said surface, whereby a sharp leading edge is provided for cleaning the surface of said fixed valve means.

10. The mixing valve of claim 9, wherein the surface of said movable valve member which is in contact with said fixed valve means, and the portion of the inside surface of said recess which is adjacent said surface is approximately perpendicular to said surface, whereby a sharp leading edge is provided for cleaning the surface of said fixed valve means.

References Cited

UNITED STATES PATENTS

| 3,023,784 | 3/1962 | Monson | 137—625.17 |
| 3,035,612 | 5/1962 | Lyon | 137—625.17 |

DANIEL BLUM, *Primary Examiner.*

U.S. Cl. X.R.

251—127